(12) United States Patent
Innocenti et al.

(10) Patent No.: US 11,076,038 B2
(45) Date of Patent: Jul. 27, 2021

(54) REVIEWING MESSAGE-BASED COMMUNICATIONS VIA A KEYBOARD APPLICATION

(71) Applicant: BYEI Accident, New York, NY (US)

(72) Inventors: Jeffrey Innocenti, New York, NY (US); Mitchell Raab, New York, NY (US); Bernardo de Seabra, New York, NY (US)

(73) Assignee: BYE! Accident LLC, Bedford Hills, NY (US)

( * ) Notice: Subject to any disclaimer, the term of this patent is extended or adjusted under 35 U.S.C. 154(b) by 0 days.

(21) Appl. No.: 16/731,445

(22) Filed: Dec. 31, 2019

(65) Prior Publication Data

US 2021/0203771 A1    Jul. 1, 2021

(51) Int. Cl.
*G06F 13/00* (2006.01)
*H04M 1/72436* (2021.01)
*H04L 12/58* (2006.01)
*H04W 4/12* (2009.01)

(52) U.S. Cl.
CPC ........ *H04M 1/72436* (2021.01); *H04L 51/02* (2013.01); *H04L 51/04* (2013.01); *H04L 51/32* (2013.01); *H04W 4/12* (2013.01)

(58) Field of Classification Search
CPC ......... H04L 51/32; H04L 51/02; H04L 51/04; H04M 1/72552; H04M 1/72436; H04W 4/12

USPC ........ 709/206, 207, 224, 223; 715/751–759, 715/255–257
See application file for complete search history.

(56) References Cited

U.S. PATENT DOCUMENTS

| | | |
|---|---|---|
| 8,578,501 B1 | 11/2013 | Ogilvie |
| 8,751,327 B2 | 6/2014 | Park et al. |
| 9,015,253 B1 | 4/2015 | Jarrett |
| 9,679,554 B1* | 6/2017 | Czuczman .............. G10L 13/00 |
| 9,749,321 B2* | 8/2017 | Farnsworth ........... H04L 51/063 |
| 2005/0027552 A1* | 2/2005 | Massanelli ............. G06Q 40/08 |
| | | 705/4 |
| 2007/0016614 A1* | 1/2007 | Novy ..................... G06F 40/143 |
| 2008/0005254 A1 | 1/2008 | Adolphs et al. |
| 2009/0063991 A1 | 3/2009 | Baron et al. |
| 2010/0217804 A1 | 8/2010 | Carrer et al. |
| 2014/0046896 A1* | 2/2014 | Potter .................... G06Q 50/01 |
| | | 707/603 |
| 2014/0208391 A1* | 7/2014 | Farnsworth ........... H04L 63/104 |
| | | 726/4 |
| 2015/0089389 A1* | 3/2015 | Cohen-Zur ............. H04W 4/12 |
| | | 715/752 |
| 2018/0351887 A1 | 12/2018 | Efrati et al. |
| 2020/0210053 A1* | 7/2020 | Baunach ................ H04L 51/32 |

\* cited by examiner

*Primary Examiner* — Kenneth R Coulter
(74) *Attorney, Agent, or Firm* — Perkins Coie LLP (57) ABSTRACT

Systems and methods are described herein for facilitating the review of messages (e.g., text messages, instant messages, chat messages, and so on) via a keyboard application of a mobile device. The message review system can facilitate a review of a message before it is sent to a recipient (e.g., a recipient of a text message or another user within a chat conversation).

20 Claims, 7 Drawing Sheets

REVIEWING MESSAGE-BASED COMMUNICATIONS VIA A KEYBOARD APPLICATION

BACKGROUND

Mobile devices provide their users with many ways to communicate with other users. Via mobile applications and other communication platforms supported by the mobile devices, users may communicate via text messaging, instant messaging, email, and other message-based protocols and mechanisms.

Communications via messaging are useful for many reasons. Messaging facilitates fast and easy ways to send and receive information, pictures, video, and so on, with other users. However, there are potential drawbacks associated with such messaging platforms. For example, the speed of use may cause a user to inadvertently send a message in haste or without properly reviewing the contents of the message. Thus, users may sometimes regret the messages they send and have no mechanism or recourse to remedy the sending of such messages. These and other drawbacks exist with respect to message-based communications.

BRIEF DESCRIPTION OF THE DRAWINGS

Embodiments of the present technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for facilitating the review of messages (e.g., text messages, instant messages, chat messages, and so on) and other text-based or message-based systems via a keyboard application of a mobile device. The systems and methods effectively provide checks and balances for users that send messages via various platforms, enabling these users to avoid sending messages they may later regret sending.

In some embodiments, the systems and methods provide a message review system within, or associated with, a keyboard application of a mobile device, such as a smartphone, tablet, laptop, or other portable or handheld computing device. The message review system can facilitate a review of a message before it is sent to a recipient (e.g., a recipient of a text message or another user within a chat conversation).

For example, the message review system may access a message located within a text buffer or keyboard buffer or other memory of a keyboard application of the mobile device before the message has been sent to the recipient via a messaging application of the mobile device. For example, the keyboard buffer can be a message buffer that contains text, images, pictures, emojis, GIFs, videos, and so on. Then, the system sends a copy of the accessed message to a reviewer selected by the user of the mobile device or a link to a message review platform that facilitates review of the message. After the message has been reviewed, the system receives an indication that the reviewer has approved (or not approved) the message. In response to an approval, the system can cause the message located within the text buffer or message buffer of the keyboard application to be sent to the recipient via the associated messaging application.

Thus, the systems and methods described herein enable users to have messages reviewed by others (e.g., friends, connections, and so on) before the messages are sent to recipients or into conversations. The mechanisms described herein facilitate review and approval quickly and easily, allowing the review process to occur without lengthy delays or time lags (e.g., effectively live or in real-time) that would hinder the user's experience when sending messages. For example, in some cases the review can occur in a matter of seconds when reviewers are also online with a user, facilitating the user to utilize the review process without incurring delays to his/her messaging conversations or chats.

Further, in some embodiments, utilizing the keyboard application enables the systems and methods to provide the message review system to any associated messaging applications. For example, the message review system can facilitate the review of messages sent to messaging applications, chat applications, social media applications, work collaboration applications, email applications, and any other applications that support message-based communications between users.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

Examples of a Suitable Computing Environment

As described herein, in some embodiments, the systems and methods enable for the review of messages and other communications via keyboard applications of mobile devices. Thus, in some cases, a keyboard application of a mobile device can act as a message review mechanism, enabling drafters of messages to share access to the message for reviewers (e.g., friends or connections) before the messages are uploaded, sent, or otherwise provided to messaging applications. The reviewers, upon accessing the messages, can approve or disapprove of the messages. Once messages are reviewed, the mechanism enables the drafter to then submit the message to the associated conversation or message thread via the associated messaging application.

Figure 1:
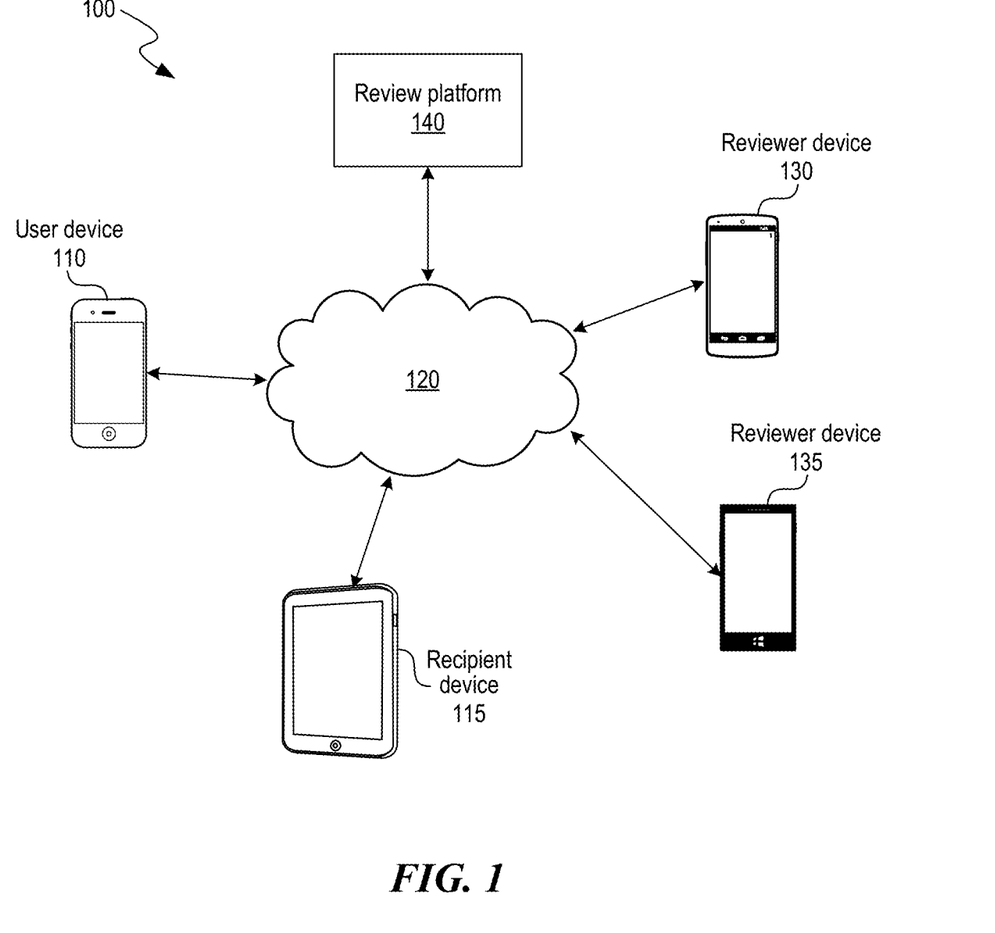
FIG. 1 is a block diagram illustrating a suitable computing environment within which to provide a message review system.

FIG. 1 is a block diagram illustrating a suitable computing environment and/or system to provide the messaging review mechanism described herein. The computing environment 100 includes a mobile device 110 or other computing device, such as a mobile or smart phone, tablet computer, laptop, mobile media device, mobile gaming device, vehicle-based computer, wearable computing device, and so on, to access various services (e.g., voice, message, and/or data services) supported by a telecommunications network 120 that is provided by a telecommunications (wireless) carrier and/or a wireless network. For example, the mobile device 110 is associated with a user drafting a message (e.g., text message, instant message) to be reviewed via the systems and methods described herein.

In various scenarios, the user of the mobile device 110 exchanges text- or message-based communications with other devices or users, such as recipient device 115. For example, users of the mobile device 110 and the mobile device 115 may engage in a lengthy text conversation, thread, or string. During the conversation (or upon initiating a conversation), the user of the mobile device 110 may wish to receive feedback about a message before the message is sent to the user associated with the recipient device 115.

Utilizing the message review system described herein, the user of the mobile device 110 identifies and/or selects users as reviewers, such as users associated with reviewer device 130 and reviewer device 135. The message review system, upon receiving a request to facilitate a review of the message, performs various operations for causing the reviewer devices 135 to access the message and perform the review.

For example, as described herein, the message review system may generate a simple web page or other web-based portal that includes the message to be reviewed (and any context or associated information) at a remote review platform 140. The system provides a link or other information that directs the reviewers to the web page, and sends the link to the reviewer devices 130, 135. Via the link, the reviewers can access the review platform 140, which facilitates the review of the message. For example, the platform 140 may provide reviewers with user-selectable options to approve, disapprove, or remain neutral (e.g., green light, red light, yellow light) with respect to a message. The platform 140 tracks and updates review totals for the message and provides the totals to the drafter of the message, who can then send the message as intended.

Figure 2:
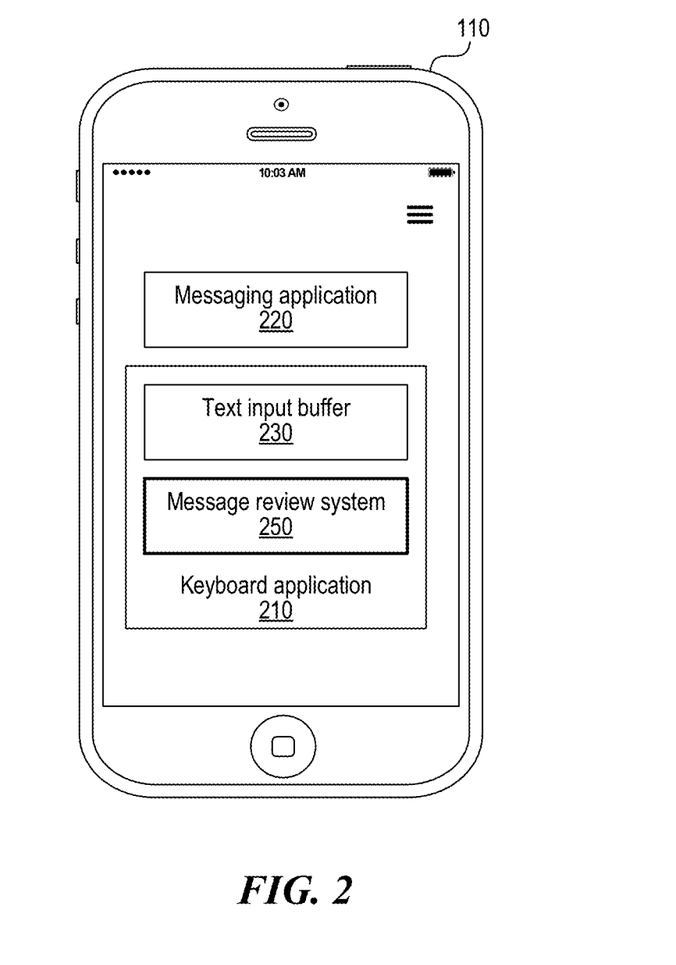
FIG. 2 is a block diagram illustrating components of a message review system.

As described herein, in some embodiments the mobile device 110 includes a system configured to facilitate the review and approval of messages created by a user of the mobile device 110. FIG. 2 is a block diagram illustrating components of a message review system 250 supported by the mobile device 110.

The mobile device 110 includes and supports a keyboard application 210. The keyboard application 110 includes an input layer configured to receive input from a user and produce a text string (or other content string) within a text input buffer 230 of the keyboard application 210. For example, the text input buffer 230 can include text input when a user of the mobile device 110 is crafting or composing a message to send to the recipient device 115 via one or more messaging applications 220.

In addition to text, the keyboard application 110 can facilitate the input of other types of input, such as images or photos, videos, GIFs, and so on. Thus, in some cases, the system can facilitate the review of messages that include non-text elements or components, such as messages that include images, photos, emojis, GIFs, video clips, and so on, before the messages are submitted to a conversation or chat or otherwise sent to another user.

In some cases, the keyboard application 210 interacts with various applications supported by the mobile device 110, such various messaging applications 220. Example messaging applications 220 include text messaging applications, email applications, chat applications, instant messaging applications, social network service applications, collaboration applications, and so on. Using a virtual keyboard provided by the keyboard application 210, the messaging applications 220 facilitate the exchange of text-based communications between users, such as senders of messages and recipients of messages. Other types of communications, such as image or sound based communications (e.g., emojis, GIFs, videos, and so on), can also occur and be supported via the messaging applications 220. Further, the messaging applications 220 can facilitate a user posting content to a webpage, social media service, or other web-based or social media supported environment.

Because many different applications utilize the keyboard application to facilitate user interactions and input, providing the message review system 250 within the keyboard application 210 enables the systems and methods to provide the review capabilities described herein within a variety of different communication channels. The keyboard is a layer of software that is often or always accessible when using the mobile device 110 and its various applications.

The keyboard application 210 may also include components/functionality of typical keyboard applications, such as components that may provide a text input functionality, a key tap functionality, a swipe, gesture, and/or contact movement functionality, or any other functionality that facilitates the reception of text-based or other input from a user. In some cases, such components can facilitate the reception of voice-based commands or other audio inputs.

The components may cause the mobile device 110 to display a keyboard via a touch-screen and receive input via a displayed keyboard presented via the touch-screen. The keyboard may be a virtual keyboard, such as any keyboard that is implemented on a touch-sensitive surface, a keyboard presented on a touch-sensitive display, a keyboard imprinted on a touch-sensitive surface, and so on. Example keyboards include a keyboard displayed on a monitor, a keyboard displayed on a touch-screen, a keyboard optically projected onto a flat or curved surface, and so on. In some cases, the keyboard may be "virtually" touched, such as a screen or projection that is controlled with some sort of pointer device or gesture recognizer.

Thus, by providing the message review system within the keyboard application 210 of the mobile device 110, the systems and methods can enhance the capabilities of the virtual keyboard, including providing an additional layer within a displayed keyboard (e.g., a layer that facilitates review of text input into the keyboard).

Although shown in FIG. 2 as being integrated with the keyboard application 210, the message review system 250 may be implemented as part of the messaging application 220, as a stand-alone application within the operating system of the mobile device 110, and so on. For example, some or all aspects of the system 250 can be implemented by a mobile application instead of the keyboard application, such as an application that hosts or supports messaging or chatting between users.

FIGS. 1, 2, and the discussion herein provide a brief, general description of a suitable computing environment in which the systems and methods can be supported and implemented. Although not required, aspects of the message review system 250 are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, augmented reality (AR) or virtual reality (VR) systems, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 100 includes network communication components that enable the mobile device 100 to communicate with remote servers or other portable electronic devices by transmitting and receiving wireless signals using a licensed, semi-licensed, or unlicensed spectrum over communications network, such as network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), 5G, Enhanced Data rates for GSM Evolution (EDGE), Universal Mobile Telecommunications System (UMTS), or Long Term Evolution (LTE) network), or other communications network.

Those skilled in the art will appreciate that various other components may be included in the mobile device 110 to enable network communication. For example, the mobile device 110 may be configured to communicate over a GSM or newer mobile telecommunications network. As a result, the mobile device 110 may include a Subscriber Identity Module (SIM) card that stores an International Mobile Subscriber Identity (IMSI) number that is used to identify the mobile device 110 on the GSM mobile or other communications networks, for example, those employing 3G, 4G, and/or 5G wireless protocols. If the mobile device 110 is configured to communicate over another communications network, the mobile device 110 may include other components that enable it to be identified on the other communications networks.

In some embodiments, the mobile device 110 may include components that enable them to connect to a communications network using Generic Access Network (GAN), Unlicensed Mobile Access (UMA), or LTE-U standards and protocols. For example, the mobile device 100 may include components that support Internet Protocol (IP)-based communication over a Wireless Local Area Network (WLAN) and components that enable communication with the telecommunications network over the IP-based WLAN. Further, while not shown, the mobile device 110 may include capabilities for permitting communications with satellites. The mobile device 110 may include one or more mobile applications that transfer data or check-in with remote servers and other networked components and devices.

Further details regarding the operation and implementation of the message review system 150 will now be described.

Examples of Providing Message Review Capabilities for Messaging Applications

As described herein, the message review system 250 facilitates the review of messages (e.g., text or chat messages) by third parties (e.g., friends of a user) before the messages are input into conversations or sent to recipients, among other benefits.

The message review system 250 may include functional modules that are implemented with a combination of software (e.g., executable instructions, or computer code) and hardware (e.g., at least a memory and processor). Accordingly, as used herein, in some examples, a module is a processor-implemented module and represents a computing or mobile device having a processor that is at least temporarily configured and/or programmed by executable instructions stored in memory to perform one or more of the particular functions that are described herein.

In some embodiments, the message review system 250 includes a message review request module. The message review request module can receive a request to review a message associated with a conversation within a messaging application of a mobile device. The message review request module can include components that facilitate the user to provide input to manually select a message (or portion of a message) to be reviewed via the system 250. For example, the virtual keyboard may include user-selectable elements that, when selected, cause the system 250 to initiate a review of a message input into the keyboard by the user.

In some embodiments, the message review system 250 includes a text access module that accesses text associated with the message and input into a text buffer of a keyboard application. For example, the text access module can access text that was input by the user of the mobile device 110 via a virtual keyboard provided by the keyboard application 210 and launched along with the messaging application 220, where the text is accessed before the message is sent to the conversation within the messaging application 220. Thus, in some cases, the text access module can copy the text input into the keyboard application 210 and paste the message to one or more reviewers.

In some embodiments, the message review system 250 includes a reviewer identification module that identifies one or more reviewers associated with the user. For example, the reviewer identification module can access a contact list stored within the mobile device 110 or within the messaging application 220, and facilitate the user selecting one or more reviewers (e.g., friends, colleagues, or other contacts) via the list.

In some embodiments, the message review system 250 includes a message approval module that facilitates the review of the message by the identified one or more reviewers associated with the user. For example, the message approval module may utilize the message review platform described herein and generate links to be sent to the selected reviewers, where the links direct the reviewers to a web page supported by the platform 140 that facilitates the review of the message.

In addition, the message review system 250 can include other modules that support the review of messages. For example, the system 250 can include a conversation capture module that captures a portion of the conversation and causes the captured portion of the conversation along with the message to be presented to the identified one or more reviewers during the facilitated review of the message by the identified one or more reviewers. For example, the conversation capture module may take a screenshot, snapshot, or other image or copy of a conversation or message thread presented by the messaging application 220 and provide that image to be displayed along with the message to be reviewed to the reviewers.

Further, in some cases, the message review system 250 includes a message submission module that determines the message has been approved by the identified one or more reviewers and causes the message to be sent to the conversation within the messaging application. For example, the message submission module can determine the message has received one or more votes of approval from reviewers, and based on the determination, automatically send the message to the messaging application 220.

Figure 3:
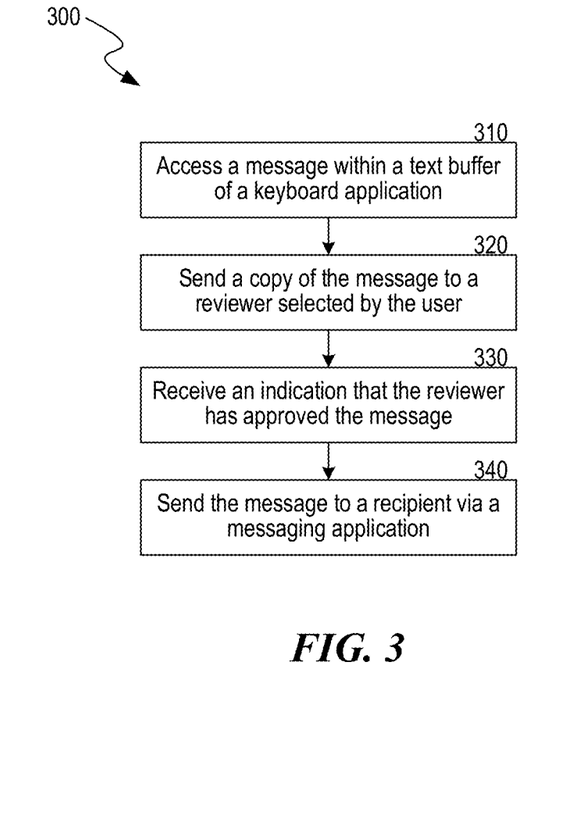
FIG. 3 is a flow diagram illustrating a method for sending a message to a recipient.

Thus, as described herein, the message review system 250 performs various processes or operations when coordinating the review of a message composed at a first device by reviewers located at other devices. FIG. 3 is a flow diagram illustrating a method 300 for sending a message to a recipient. The method 300 may be performed by the message review system 250 and, accordingly, is described herein merely by way of reference thereto. It will be appreciated that the method 300 may be performed on any suitable hardware.

In operation 310, the message review system 250 accesses a message located within a text buffer of a keyboard application of the mobile device before the message has been sent to the recipient via a messaging application of the mobile device. For example, the text access module can access text that was input by the user of the mobile device 110 via a virtual keyboard provided by the keyboard application 210 and launched along with the messaging application 220, where the text is accessed before the message is sent to the conversation within the messaging application 220.

In operation 320, the message review system 250 sends a copy of the accessed message to a reviewer selected by the user of the mobile device. For example, the reviewer identification module can access a contact list stored within the mobile device 110 or within the messaging application 220, and facilitate the user selecting one or more reviewers (e.g., friends, colleagues, or other contacts) via the list. The system 250 can then send the message to be reviewed to the selected reviewers, as described herein.

In operation 330, the message review system 250 receives an indication that the reviewer has approved the message. For example, the message review system 250 receives an indication that the selected reviewer has selected an "approved" button presented along with the message and while viewing the message. As another example, the reviewer may send a message back (via a selection within a text message) that indicates his/her feedback to the message (e.g., a Y or N or Heck No! message sent back to the system 250).

In operation 340, in response to the received indication that the reviewer has approved the message, the message review system 250 causes the message located within the text buffer of the keyboard application to be sent to the recipient via the messaging application. For example, the message submission module can determine the message has received one or more votes of approval from reviewers, and based on the determination, automatically send the message within the text buffer 230 to the messaging application 220.

Figure 4:
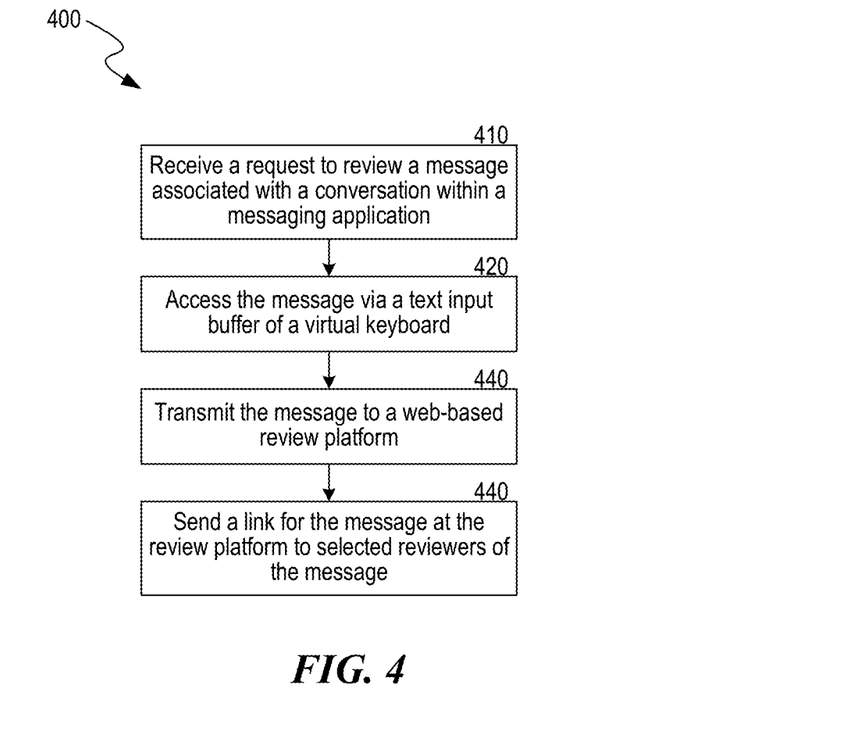
FIG. 4 is a flow diagram illustrating a method for facilitating the review of a message via a message review platform.

In some embodiments, the message review system 250 utilizes the message review platform 140 to facilitate the review of messages by reviewers (e.g., users at third party devices). FIG. 4 is a flow diagram illustrating a method 400 for facilitating the review of a message via a message review platform. The method 400 may be performed by the message review system 250 and, accordingly, is described herein merely by way of reference thereto. It will be appreciated that the method 400 may be performed on any suitable hardware.

In operation 410, the message review system 250 receives a request to review a message associated with a conversation within a messaging application, where the conversation includes a user associated with the mobile device and one or more participants. For example, the message review request module can receive a request to review a message associated with a conversation within a messaging application of a mobile device. The message review request module can include components that facilitate the user to provide input to manually select a message (or portion of a message) to be reviewed via the system 250. For example, the virtual keyboard may include user-selectable elements that, when selected, cause the system 250 to initiate a review of a message input into the keyboard by the user.

In some cases, the system 250 may cause an automatic trigger or request to review the message before it is sent to the messaging application 220. For example, the system 250 can determine the message includes one or more keywords associated with an automatic review of the message, and automatically trigger the request to review the message associated with the conversation within the messaging application. The keywords may indicate a certain sentiment or intent within the message, where the sentiment (e.g., anger or sadness) may warrant a review by others.

As another example, the system 250 can determine the conversation includes one or more participants associated with an automatic review of the message, and automatically trigger the request to review the message associated with the conversation within the messaging application. The participant may be another co-worker, a boss, a parent, or other people for whom the user may wish to have messages reviewed before being sent.

Further, the system 250 can determine the message is input at a time of day and within a certain messaging application that are associated with an automatic review of the message, and automatically trigger the request to review the message associated with the conversation within the messaging application. For example, the system 250 may trigger review after midnight for messages composed and to be sent within dating applications or other social media applications.

In addition, the system 250 may consider a number of factors or apply certain rules when determining whether to automatically trigger review of messages. For example, the user of the mobile device 110 may set rules that request review of messages that combine some or all of the contexts described herein.

In operation 420, the message review system 250 accesses text input into a text buffer of the keyboard application. For example, the text may be input by the user of the mobile device via a virtual keyboard provided by the keyboard application and launched along with the messaging application and is part of the message requested to be reviewed.

In operation 430, the message review system 250 transmits the message to a web-based review platform. For example, the message approval module may utilize the message review platform 140 and generate links to be sent to selected reviewers, where the links direct the reviewers to a web page supported by the platform 140 that facilitates the review of the message.

The message approval module may send additional information along with the message to facilitate the review of the message. For example, the module may send information identifying other participants of the conversation and/or may generate guidance information for reviewers. Example guidance information can include a question ("is this message too harsh?" or statement ("I think this is the right tone") specifying how to review the message to the reviewers.

Also, in some cases, the system 250 can send images identifying the conversation to which the message is to be sent. For example, the system 250 captures images of the conversation within the messaging application and sends the captured image of the conversation along with the message to be reviewed to the message review platform. The message review platform 140 may present the captured image of the conversation to the identified one or more reviewers associated with the user during review of the message.

In operation 440, the message review system 250 communicates a link to the identified one or more reviewers that directs the one or more reviewers to the message review platform 140, which is remote from the mobile device 110, to facilitate review of the message.

The reviewers, in some cases, include one or more users within a list of contacts stored by the mobile device associated with the user. However, reviewers can also be connections to the user within social media services, contacts within a messaging application, and so on. Further, the system 250 can target one or more reviewers that have previously reviewed messages associated with the conversation within the messaging application when reviewing additional messages for the user during the same or similar conversations.

Figure 5:
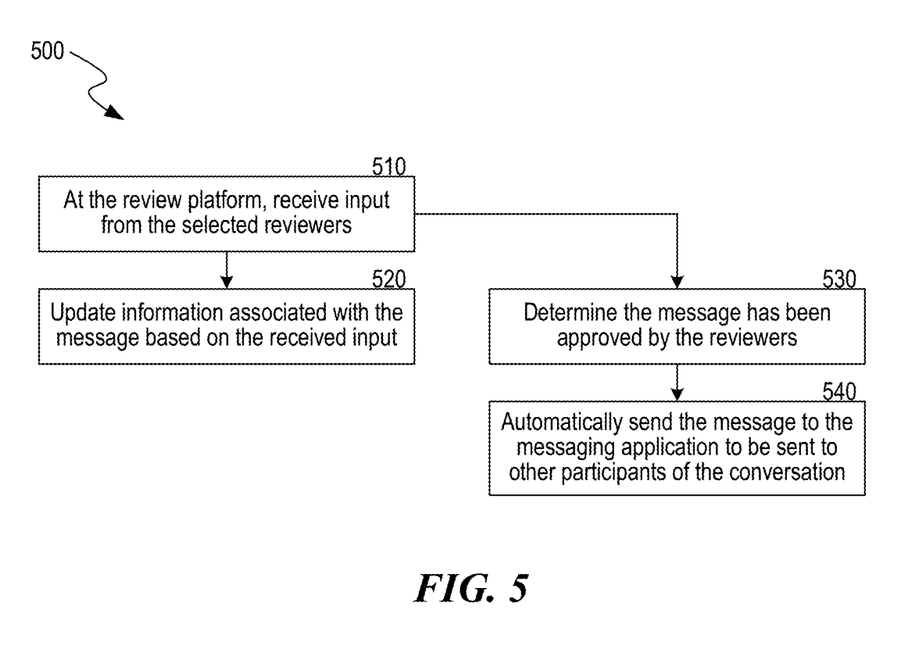
FIG. 5 is a flow diagram illustrating a method for acting upon a message reviewed via a message review platform.

As described herein, the message review platform 140 enables selected reviewers to review the messages and provide feedback (e.g., approve or deny the messages). FIG. 5 is a flow diagram illustrating a method 500 for acting upon a message reviewed via a message review platform. The method 500 may be performed by the review platform 140 and, accordingly, is described herein merely by way of reference thereto. It will be appreciated that the method 500 may be performed on any suitable hardware.

In operation 510, the review platform 140 receives feedback from the selected viewers. For example, the platform 140 generates a web-based display page that presents, to the one or more reviewers, information identifying the message to be reviewed and user-selectable elements that facilitate receiving input from the one or more reviewers. The user-selectable elements include, in some cases, an element associated with approving the message to be sent to the conversation within the messaging application and an element associated with not approving the message to be sent to the conversation within the messaging application. Further, the display page can include an element associated with receiving edits to the message from the one or more reviewers.

In operation 520, the review platform 140 updates information associated with the message based on the received input from the reviewers. For example, the platform 140 may update an approval page associated with the message based on the received input. The approval page can include statistics for the message (and other messages), indicating the feedback provided by the reviewers.

Alternatively, in operation 530, the review platform 140 determines the message has been approved by the reviewers. In operation 540, the message review system 250 sends the message to the messaging application to be sent to other participants within the conversation. For example, the system 250 receives, from the message review platform 140, an indication that the message has been approved by the identified one or more reviewers and causes the message to be sent to the conversation within the messaging application 220.

Figure 6A:
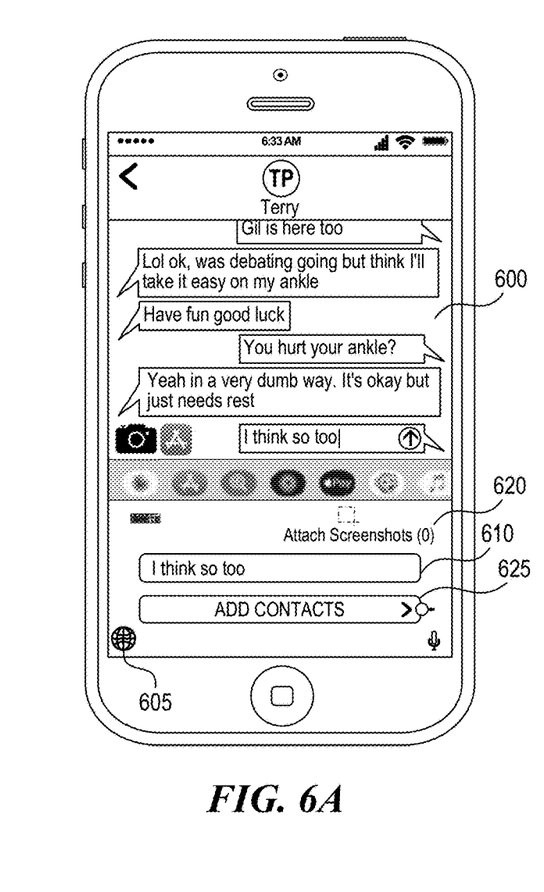
FIGS. 6A-6C are display diagrams illustrating user interfaces that facilitate the review of a message before the message is sent to a recipient.
Figure 6B:
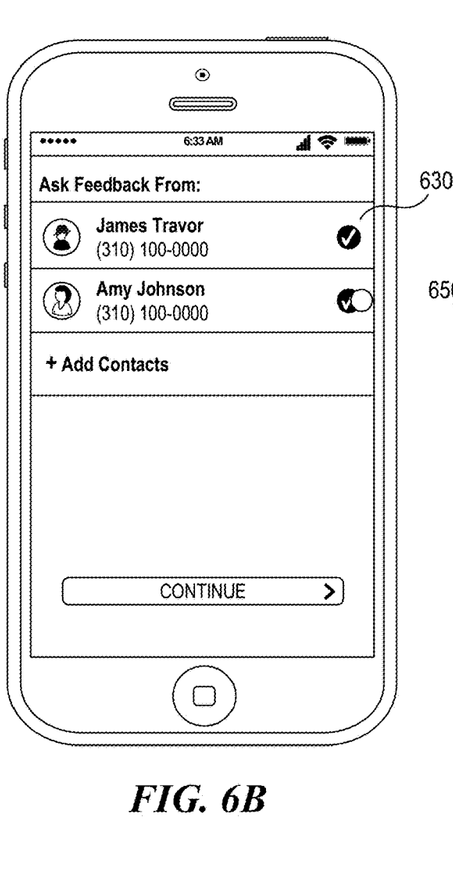
Figure 6C:
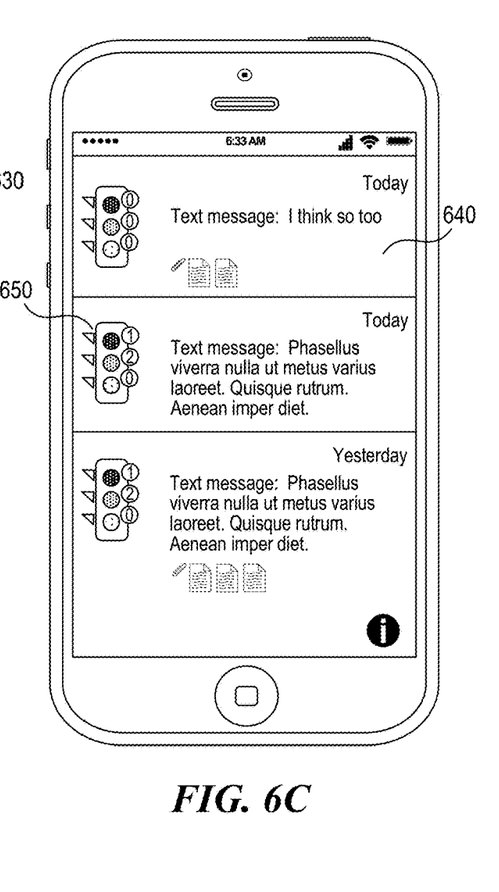

Thus, in some embodiments, the message review system 250 enables users to efficiently and quickly have messages reviewed before they are submitted or uploaded to messaging applications. FIGS. 6A-6C are display diagrams illustrating user interfaces that facilitate the review of a message before the message is sent to a recipient.

FIG. 6A depicts a user interface of a virtual keyboard layer 605 where a message 610 is selected to be reviewed before it is sent to a text message thread or conversation 600. The user interface provides a user-selectable element 625 to select reviewers from the user's contacts. Further, the keyboard layer 605 includes an option 620 to take a screenshot, snapshot, or otherwise capture an image of the conversation 600 to be provided along with the message.

Upon selection of the contact list request, the system 250 renders the user interface depicted in FIG. 6B, where the user selects one or more reviewers 630 to review the message. Once selected, the system 250 performs methods 300 or 400, and sends information to the selected reviewers to facilitate review of the message 610.

FIG. 6C depicts a user interface that includes a list of the messages under review, including an entry 640 for message 610. As shown, the list presents review statistics for each of the messages via various indicators 650, such as the traffic light icons depicted in the interface. Of course, the system can present other indicators or information for messages under review, such as information indicating the duration of the review, information indicating the message has been approved, information indicating the message has been edited, information indicating the message has been upvoted or downvoted, and so on. Further, other indicators can provide different types and scales of approval or review statistics, such as percentages, numerical scales (e.g., 1-10), and so on.

Figure 7A:
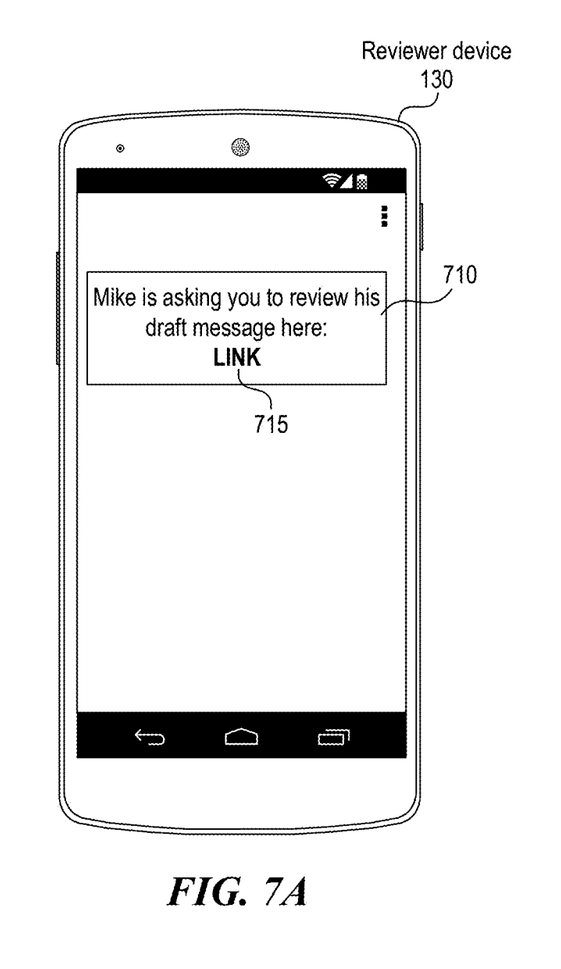
FIGS. 7A-7B are display diagrams illustrating user interfaces presented to reviewers of a message.
Figure 7B:
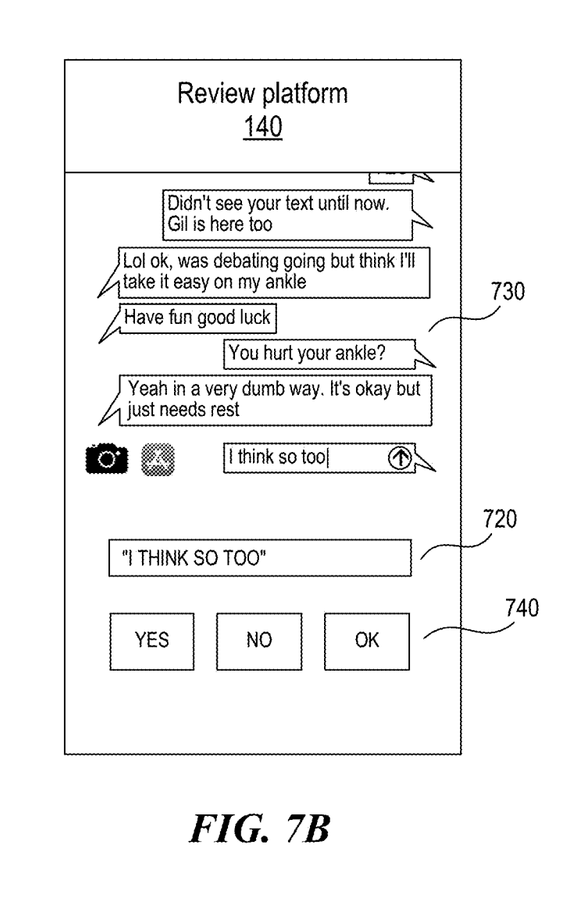

The system 250 also presents various interfaces or information to reviewers. FIGS. 7A-7B are display diagrams illustrating user interfaces presented to reviewers of a message. FIG. 7A depicts a text message 710 sent to a reviewer. The message 710 includes a link 715 to a web page that hosts the review of the message 610.

Upon selection of the link 715, the reviewer is directed to a web page (e.g., via the reviewer's web browser or an associated application) for review of the message and provided by the platform 140. FIG. 7B depicts the web page. The web page 720 presents the message to be reviewed 720, an image 730 of the associated conversation, and user-selectable elements 740 to facilitate receiving from the reviewer associated with approving (or not approving) the message 720. The web page can include other elements not depicted in FIG. 7B, such as elements that enable the reviewer to provide comments, to edit the message, to send to other reviewers, and so on.

As described herein, the message review system 250 enables a composer of a message to quickly and efficiently receive input regarding messages they are composing before the messages are sent to recipients.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
using a keyboard application comprising a user selectable element configured to facilitate a review of a message associated with a conversation by:
receiving a request to review the message associated with the conversation within a messaging application,
wherein the conversation includes a user associated with a mobile device and one or more participants;
accessing text input into a text buffer of the keyboard application,
wherein the text was input by the user of the mobile device via a virtual keyboard provided by the keyboard application and launched along with the messaging application, and
wherein the text is part of the message requested to be reviewed;

identifying one or more reviewers associated with the user;

communicating a link to the identified one or more reviewers that directs the one or more reviewers to a message review platform remote from the mobile device, wherein the message review platform facilitates the review of the message in a context of a recent set of messages in the conversation by the identified one or more reviewers associated with the user.

2. The method of claim 1, further comprising:
receiving, from the message review platform, an indication that the message has been approved by the identified one or more reviewers; and
causing the message to be sent to the conversation within the messaging application.

3. The method of claim 1, wherein the message review platform generates a web-based display page that presents to the one or more reviewers:
information identifying the message to be reviewed; and
displayed user-selectable elements that facilitate receiving input from the one or more reviewers,
wherein the user-selectable elements include an element associated with approving the message to be sent to the conversation within the messaging application and an element associated with not approving the message to be sent to the conversation within the messaging application.

4. The method of claim 1, wherein the message review platform generates a web-based display page that presents to the one or more reviewers:
information identifying the message to be reviewed; and
user-selectable elements that facilitate receiving input from the one or more reviewers,
wherein the user-selectable elements include an element associated with receiving edits to the message from the one or more reviewers.

5. The method of claim 1, further comprising:
at the message review platform:
presenting information identifying the message to be reviewed;
receiving input from the one or more reviewers; and
updating an approval page associated with the message based on the received input.

6. The method of claim 1, wherein the request to review the message is received from the user associated with the mobile device before the message is sent to the conversation within the messaging application.

7. The method of claim 1, further comprising:
capturing an image of the conversation within the messaging application; and
sending the captured image of the conversation along with the message to be reviewed to the message review platform,
wherein the message review platform presents the captured image of the conversation to the identified one or more reviewers associated with the user during review of the message.

8. The method of claim 1, further comprising:
determining the message includes one or more keywords associated with an automatic review of the message; and
automatically triggering the request to review the message associated with the conversation within the messaging application.

9. The method of claim 1, further comprising:
determining the conversation includes the one or more participants associated with an automatic review of the message; and
automatically triggering the request to review the message associated with the conversation within the messaging application.

10. The method of claim 1, further comprising:
determining the message is input at a time of day and within a certain messaging application that are associated with an automatic review of the message; and
automatically triggering the request to review the message associated with the conversation within the messaging application.

11. The method of claim 1, wherein the messaging application facilitates sending of text messages between the user and the one or more participants of the conversation.

12. The method of claim 1, wherein the messaging application facilitates sending of chat messages between the user and the one or more participants of the conversation.

13. The method of claim 1, wherein the messaging application is part of a social media platform that includes the user and the one or more participants of the conversation.

14. The method of claim 1, wherein identifying one or more reviewers associated with the user includes identifying one or more users within a list of contacts stored by the mobile device associated with the user.

15. The method of claim 1, wherein identifying one or more reviewers associated with the user includes identifying one or more reviewers that have previously reviewed messages associated with the conversation within the messaging application.

16. The method of claim 1, wherein the link is associated with a web-based review page associated with the user and supported by the message review platform.

17. A system, comprising:
a message review request module that receives a request to review a message associated with a conversation within a messaging application of a mobile device,
wherein the conversation includes a user associated with the mobile device and one or more participants;
a text access module that accesses text associated with the message and input into a text buffer of a keyboard application,
wherein the text was input by the user of the mobile device via a virtual keyboard provided by the keyboard application and launched along with the messaging application, and
wherein the text is accessed before the message is sent to the conversation within the messaging application;
a reviewer identification module that identifies one or more reviewers associated with the user; and,
a message approval module that facilitates the review of the message by the identified one or more reviewers associated with the user,
wherein the review of the message is in a context of a recent set of messages in the conversation.

18. The system of claim 17, further comprising:
a conversation capture module that:
captures a portion of the conversation; and
causes the captured portion of the conversation along with the message to be presented to the identified one or more reviewers during the facilitated review of the message by the identified one or more reviewers.

19. The system of claim 17, further comprising:
a message submission module that:
    determines the message has been approved by the identified one or more reviewers; and
    causes the message to be sent to the conversation within the messaging application.

20. A non-transitory computer-readable medium whose contents, when executed by a computing device, cause the computing device to perform a method of sending a message from a user of the computing device to a recipient, the method comprising:
    accessing the message located within a text buffer of a keyboard application of the computing device before the message has been sent to the recipient via a messaging application of the computing device;
    sending a copy of the accessed message and a recent set of messages in a conversation to which the accessed message belongs to a reviewer selected by the user of the computing device;
    receiving an indication that the reviewer has approved the message; and
    in response to the received indication that the reviewer has approved the message, causing the message located within the text buffer of the keyboard application to be sent to the recipient via the messaging application.

* * * * *